United States Patent
Hill et al.

(10) Patent No.: US 10,393,016 B2
(45) Date of Patent: Aug. 27, 2019

(54) INLET MANIFOLD FOR MULTI-TUBE PULSE DETONATION ENGINE

(71) Applicant: United Technologies Corporation, Farmington, CT (US)

(72) Inventors: James D. Hill, Tolland, CT (US); Michael J. Cuozzo, Palm City, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 341 days.

(21) Appl. No.: 15/109,049

(22) PCT Filed: Dec. 19, 2014

(86) PCT No.: PCT/US2014/071576
§ 371 (c)(1),
(2) Date: Jun. 29, 2016

(87) PCT Pub. No.: WO2015/138033
PCT Pub. Date: Sep. 17, 2015

(65) Prior Publication Data
US 2016/0326956 A1  Nov. 10, 2016

Related U.S. Application Data

(60) Provisional application No. 61/922,590, filed on Dec. 31, 2013.

(51) Int. Cl.
*F02C 5/02* (2006.01)
*F02C 5/10* (2006.01)
(Continued)

(52) U.S. Cl.
CPC .................. *F02C 5/02* (2013.01); *F02C 5/10* (2013.01); *F02C 6/08* (2013.01); *F23R 7/00* (2013.01)

(58) Field of Classification Search
CPC ...... F02C 5/02; F02C 5/10; F02C 6/06; F02C 6/08; F02C 7/185; F23R 7/00
See application file for complete search history.

(56) References Cited

U.S. PATENT DOCUMENTS

| | | | | |
|---|---|---|---|---|
| 2,593,523 A | * | 4/1952 | Bauger | F02C 5/10 415/208.3 |
| 4,182,117 A | * | 1/1980 | Exley | F02C 6/08 60/785 |

(Continued)

FOREIGN PATENT DOCUMENTS

| FR | 2829528 A1 | 3/2003 |
|---|---|---|
| GB | 803698 A | 10/1958 |

OTHER PUBLICATIONS

European Search Report Issued in EP Application No. 14885222.1, dated Sep. 7, 2017, 7 Pages.

(Continued)

*Primary Examiner* — Ted Kim
(74) *Attorney, Agent, or Firm* — Cantor Colburn LLP

(57) ABSTRACT

An inlet manifold for a multi-tube pulse detonation engine includes a vaneless diffuser disposed in a first zone to collect an air discharged from a compressor; a vaned diffuser including a plurality of guide vanes disposed in a second zone to slow the air from the compressor; a plenum disposed in a third zone located next to second zone to provide the air from the compressor to chambers; and a splitter disposed in a fourth zone to split the air from the compressor into an airflow required by each pulse detonation tube for detonation.

18 Claims, 5 Drawing Sheets

(51) Int. Cl.
  *F02C 6/08* (2006.01)
  *F23R 7/00* (2006.01)

(56) References Cited

U.S. PATENT DOCUMENTS

| | | | |
|---|---|---|---|
| 4,368,005 A | 1/1983 | Exley et al. | |
| 6,666,018 B2* | 12/2003 | Butler | F02K 3/075 |
| | | | 60/226.1 |
| 7,137,243 B2 | 11/2006 | Snyder et al. | |
| 7,147,426 B2* | 12/2006 | Leblanc | F01D 5/145 |
| | | | 415/1 |
| 7,824,148 B2 | 11/2010 | Tetu et al. | |
| 8,556,573 B2 | 10/2013 | LeBlanc | |
| 2004/0123583 A1* | 7/2004 | Nordeen | F02C 3/16 |
| | | | 60/226.1 |
| 2004/0250529 A1* | 12/2004 | Macarez | F02C 5/02 |
| | | | 60/225 |
| 2009/0133377 A1 | 5/2009 | Kenyon et al. | |
| 2009/0266047 A1* | 10/2009 | Kenyon | F02C 5/02 |
| | | | 60/39.76 |
| 2010/0077768 A1* | 4/2010 | Leblanc | F02C 3/08 |
| | | | 60/785 |
| 2012/0122039 A1* | 5/2012 | Kenyon | F02C 5/02 |
| | | | 431/1 |
| 2013/0098062 A1* | 4/2013 | Donahoo | F02C 7/12 |
| | | | 60/785 |
| 2013/0265848 A1 | 10/2013 | Wurz et al. | |

OTHER PUBLICATIONS

International Search Report for International Application No. PCT/US2014/071576; dated Aug. 20, 2015.
Written Opinion for International Application No. PCT/US2014/071576; dated Aug. 20, 2015.

* cited by examiner

INLET MANIFOLD FOR MULTI-TUBE PULSE DETONATION ENGINE

CROSS-REFERENCE TO RELATED APPLICATIONS

This application is a National Phase Application of Patent Application PCT/US2014/071576 filed on Dec. 19, 2014, which claims priority to U.S. Provisional Application No. 61/922,590 filed on Dec. 31, 2013 and titled Inlet Manifold for Multi-Tube Pulse Detonation Engine, the entire contents of each of these applications are hereby incorporated by reference.

This application was made with Government support under Contract No. HR0011-09-C-0052. The Government has certain rights in this application.

FIELD OF USE

The present disclosure relates to an inlet manifold for a gas turbine engine, and more particularly, to a configuration of an inlet manifold for a pulse detonation gas turbine engine.

BACKGROUND

In a gas turbine pulse detonation engine, air discharged from the high pressure compressor (HPC) must be diffused, collected, and split into portions required for individual pulse detonation tubes (PDTs) configured to combust the fuel-air mixture using a detonation reaction. Each pulse detonation tube functions as an individual combustion chamber in the pulse detonation engine.

In a gas turbine engine that uses a centrifugal or axial compressor, air flow is typically directed by pipes that direct the flow and diffuse it into an annular plenum. In a pulse detonation engine, the flow from the high pressure compressor (centrifugal or axial) is still diffused in a manifold but is typically directed into individual tubes from a common plenum. Such an arrangement can maintain an interface with a rotor, but tends to result in significant unsteady air flow in the rotor.

A portion of the air to be used as high pressure turbine cooling needs to be bled off for further conditioning. This must be done in such a manner as to not stall the high pressure compressor or cause undue upstream airflow fluctuations.

SUMMARY

Disclosed and claimed herein is an inlet manifold for a multi-tube pulse detonation engine. In one embodiment, an inlet manifold for a multi-tube pulse detonation engine includes a vaneless diffuser disposed in a first aerodynamic zone and said vaneless diffuser is configured to collect an air discharged from a compressor and direct it into a second aerodynamic zone. The inlet manifold further includes a vaned diffuser that is composed of a plurality of guide vanes disposed in the second aerodynamic zone, and the guide vanes are configured to slow the air flow from the compressor and maximize a static pressure of the air going into pulse detonation tubes. The inlet manifold further includes a structure defining a plenum disposed in a third aerodynamic zone located between the vaned diffuser and an individual pulse detonation tube manifold, said plenum being sized to provide a location where the air can continue to flow into a next manifold when an air valve for the pulse detonation tube closes in a preceding manifold. The inlet manifold further includes a splitter disposed in a fourth aerodynamic zone, and said splitter is configured to split the air from the compressor into an airflow required by each pulse detonation tube for detonation.

According to another embodiment of the present disclosure, an inlet manifold for a multi-tube pulse detonation engine further includes a plurality of bleed ports, each being disposed in the fourth aerodynamic zone. According to one exemplary embodiment, six bleed ports are provided in the inlet manifold for a multi-tube pulse detonation engine if the pulse detonation engine is comprised of six pulse detonation tubes, and each bleed port is disposed in the fourth aerodynamic zone to be used for cooling a high pressure turbine. The bleed ports disclosed in the present application are further configured to maintain compressor stability during sudden power demand changes or when a core flow is reduced.

The details of one or more embodiments of the present disclosure are set forth in the accompanying drawings and the description below. Other features, objects, and advantages of the present invention will be apparent from the description and drawings, and from the claims. It should be understood, however, that the following description and drawings are intended to be exemplary in nature and non-limiting.

BRIEF DESCRIPTION OF THE DRAWINGS

The accompanying drawings, which are incorporated in and constitute a part of this specification illustrate exemplary embodiment of the disclosure and together with the description, serve to explain the principles of the disclosure.

DETAILED DESCRIPTION

One aspect of the present disclosure relates to an inlet manifold for a multi-tube pulse detonation engine, and more particularly, to a configuration of the inlet manifold for a pulse detonation gas turbine engine.

Figure 1A:
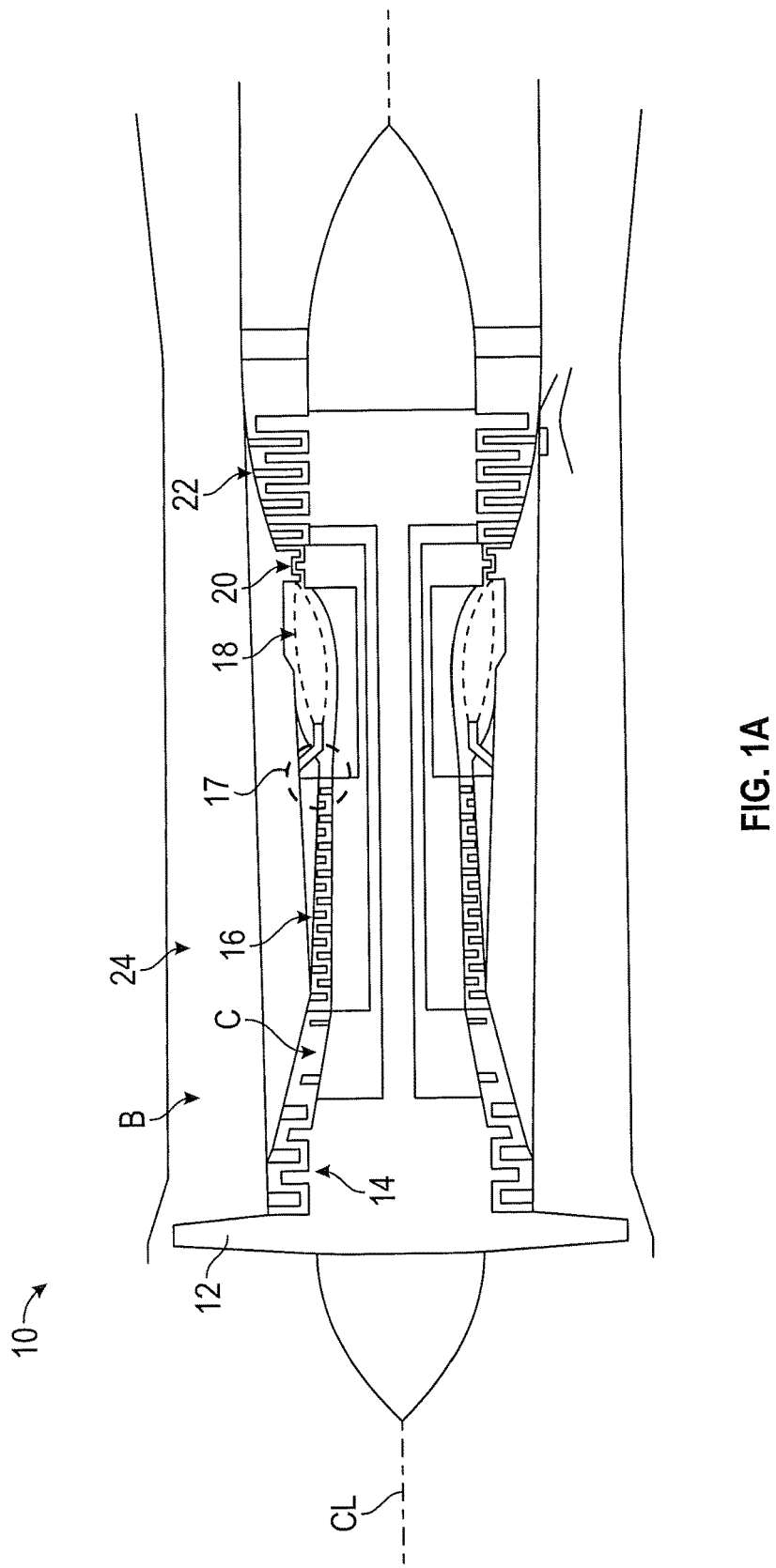
FIG. 1A is an illustrative cross-sectional view of a gas turbine engine.
Figure 1B:
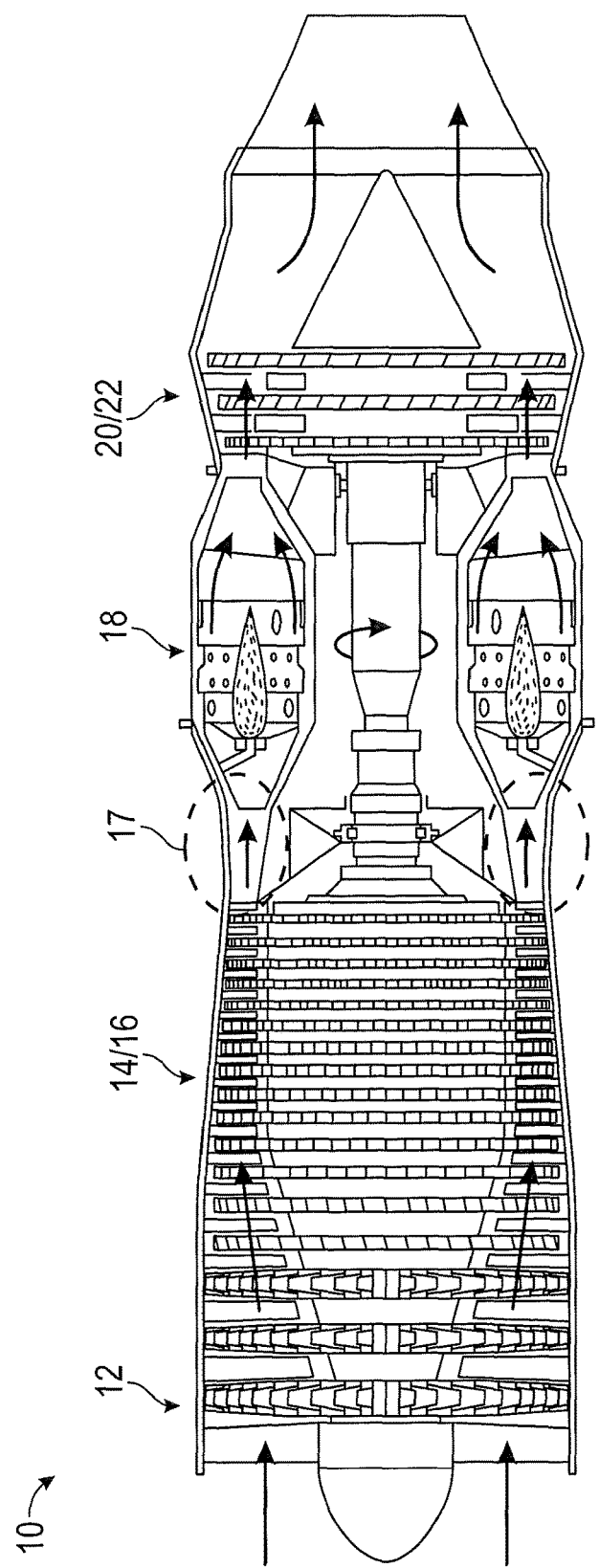
FIG. 1B is an illustrative detailed cross-sectional view of a gas turbine engine.

FIG. 1A is an illustrative cross-sectional view of a gas turbine engine 10, and FIG. 1B is an illustrative detailed cross-sectional view of a gas turbine engine 10. Referring to FIGS. 1A and 1B, an exemplary gas turbine engine 10 comprises a fan section 12, a compression section 14/16 including a low-pressure compressor 14, a high-pressure compressor 16, an inlet manifold 17 disposed between the compression section 14/16 and a combustion section 18, a combustion section 18 including one or more combustors, a turbine section 20/22 including a high-pressure turbine 20 and a low-pressure turbine 22, and a fan bypass duct 24. A centerline CL is defined by the engine 10. The fan section 12 drives air along a bypass flow path B formed through the bypass duct 24, while the compression section 14/16 drive air along a core flow path C formed through the low-pressure compressor 14 and high-pressure compressor 16 into the combustion section 18 and the turbine section 20/22.

Figure 2:
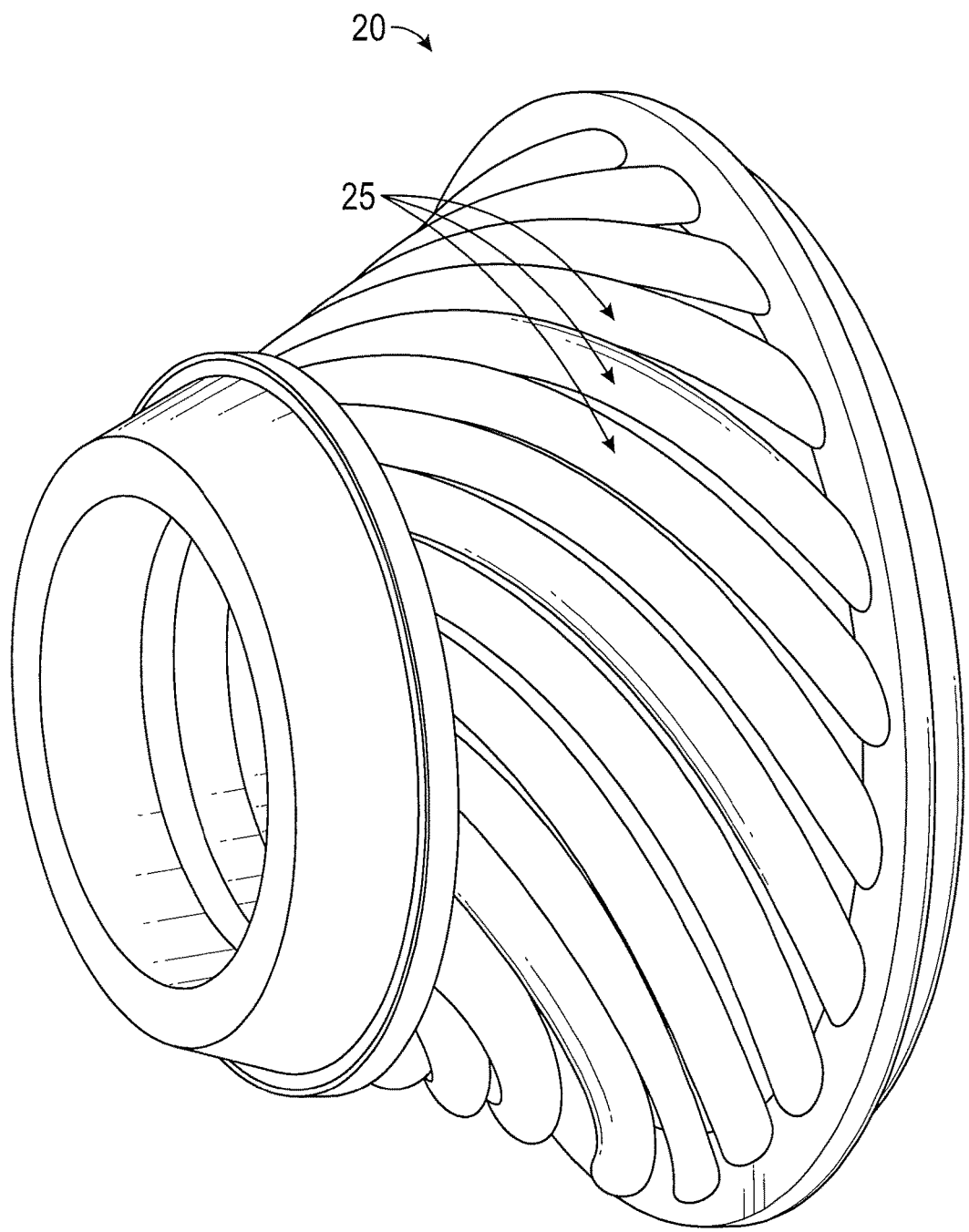
FIG. 2 is a schematic view of pulse detonation combustors.

In one embodiment, the inlet manifold 17 is configured to change the direction of air flow discharged from the high pressure centrifugal compressor 16, convert velocity to static pressure, and provide the air to the individual pulse detonation tube 25 of FIG. 2. An enlarged schematic view of an exemplary inlet manifold 30 for use in a multi-tube pulse detonation engine to receive and direct air from the compression section 14/16 in accordance with the present disclosure is discussed below with respect to FIGS. 3-5.

Figure 3:
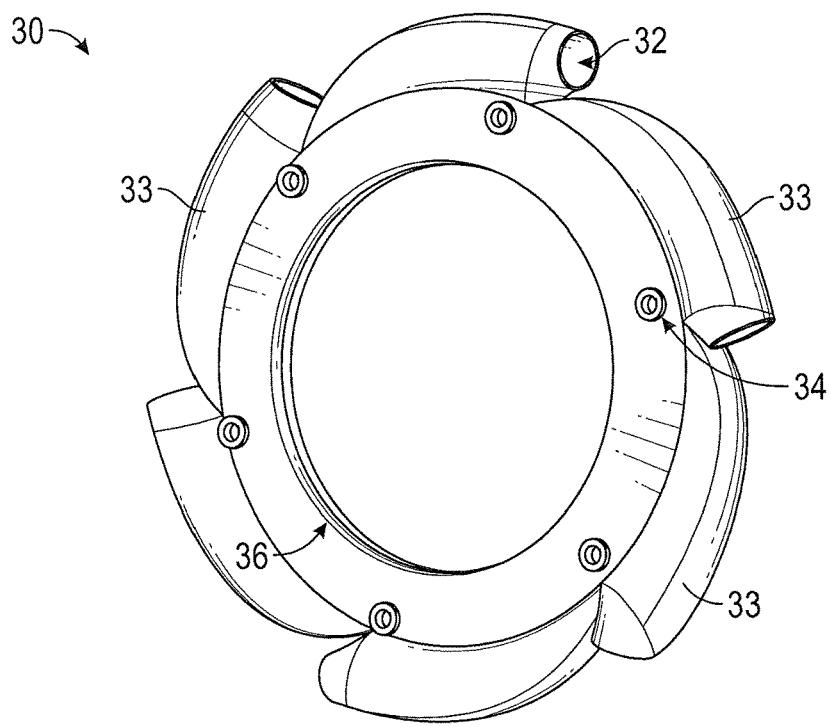
FIG. 3 is a schematic view of an inlet manifold.

FIG. 2 is a schematic view of an exemplary pulse detonation combustor 23. It is noted that although FIG. 2 illustrates a twenty-tube pulse detonation combustor, an inlet manifold illustrated in FIG. 3 is for a six-tube pulse detonation combustor for the benefit of simplicity. As illustrated in FIG. 2, the pulse detonation combustor 23 comprises a plurality of pulse detonation tubes 25, for example, twenty tubes. Each tube 25 is connected to respective pulse detonation tube inlet 32 of the exemplary inlet manifold 30 of FIG. 3.

FIG. 3 is a schematic view of an inlet manifold 30 according to one embodiment. Referring to FIG. 3, an inlet manifold 30 includes six pulse detonation tube inlet sections 33 and six pulse detonation tube inlets 32. The inlet manifold 30 further includes six turbine cooling bleeds 34 configured to cool down the turbines 20/22, six bleed ports (not shown) each of which is disposed in the pulse detonation tube inlet sections 33, and an inlet 36 to the inlet manifold 30. The inlet 36 is configured to receive air from the outlet of the high pressure compressor 16, and corresponds to zone 41 of FIG. 5 and will be described with reference to FIG. 5.

The six bleed ports are provided in the pulse detonation tube inlet section 33 and are designed to provide an airflow required for cooling turbines. These ports are designed to smoothly extract a high-pressure airflow, which is conditioned to provide cooling air for the high pressure turbine. In addition, these bleed ports can be used with other existing bleeds including inter-stage bleed and handling bleed to maintain and augment compressor stability during sudden power demand changes or when the core flow is reduced due to a 25-percent power requirement. The pulse detonation tube 25 as shown in FIGS. 2 and 4 constitutes one combustor chamber and is coupled to a respective pulse detonation tube inlet 32.

Figure 4:
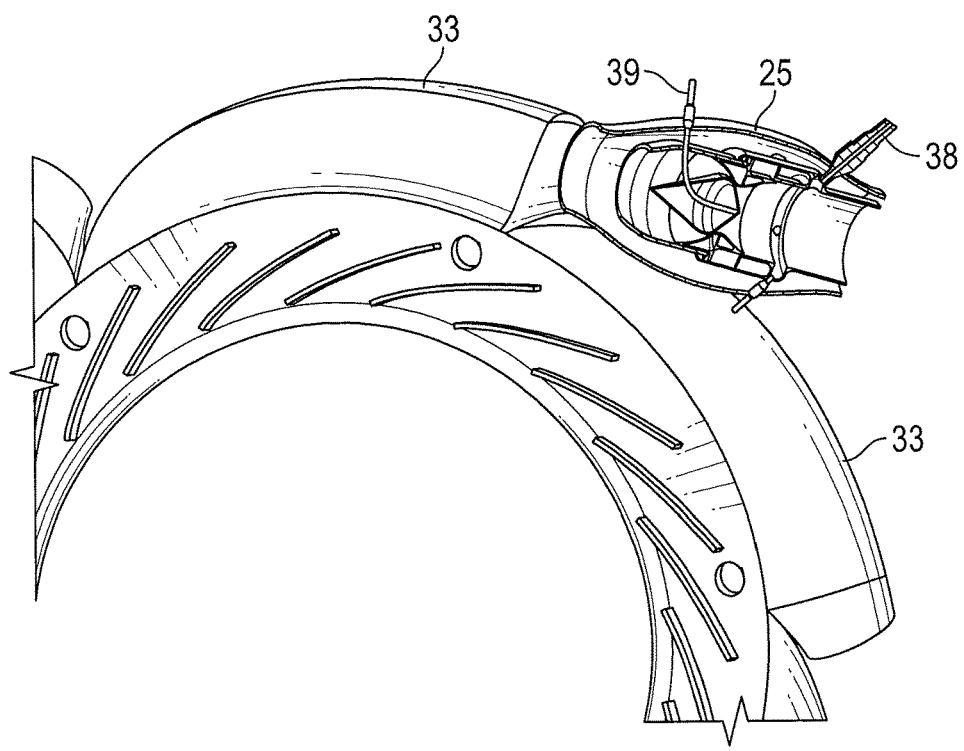
FIG. 4 is an enlarged partial cut-away perspective view of an inlet manifold of FIG. 3.

FIG. 4 is an enlarged partial cut-away perspective view of the inlet manifold of FIG. 3. Referring to FIG. 4, the number of pulse detonation tube inlet sections 33 equals the number of pulse detonation tubes 25, and each pulse detonation tube inlet 32 is coupled to the pulse detonation tube 25 to provide the air from the compressor 16 to the individual pulse detonation tube 25 in a sequential or predetermined manner. A main fuel igniter 38 and a fuel injector 39 are provided in the pulse detonation tube 25 for combustion.

Figure 5:
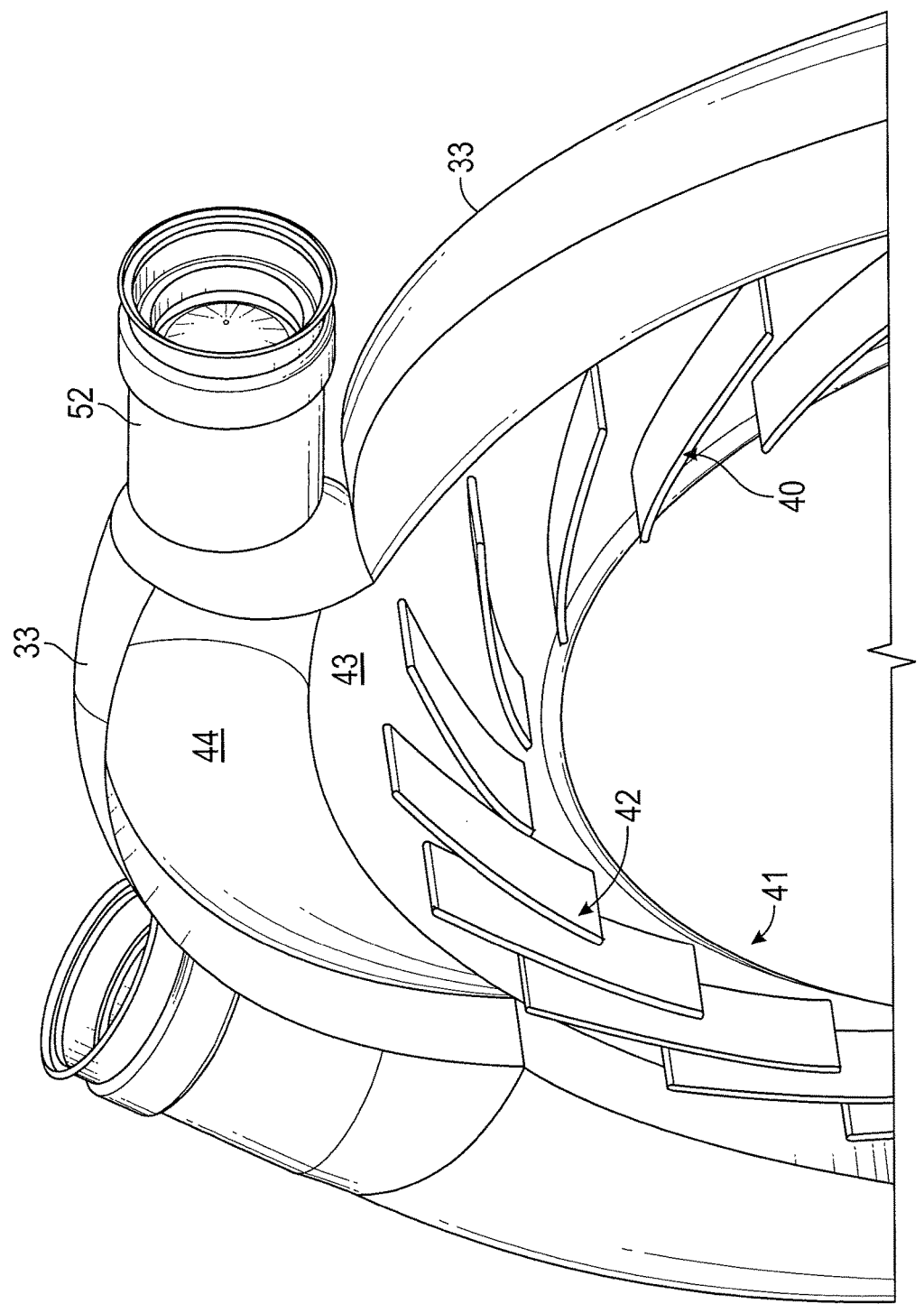
FIG. 5 is an enlarged partial cut-away perspective view of an inlet manifold of FIG. 3.

FIG. 5 is an enlarged partial cut-away perspective view of the inlet manifold 30 of FIG. 3. Referring to FIGS. 3 and 5, an exemplary inlet manifold 30 has six pulse detonation tube inlet sections 33, each of which has four aerodynamic zones 41-44 configured to change the direction of the exit air flow from the high pressure compressor 16, convert velocity to static pressure, and present the air to the individual pulse detonation tubes 25.

Referring to FIGS. 1B, 3 and 5, the air discharged from the high-pressure compressor 16 must be collected, diffused, and split into portions required for the individual pulse detonation tubes 25. In addition, the air for the high-pressure turbine 20 must be bled off for further conditioning. This must all be done in such a manner as to not stall the high-pressure compressor or cause undue upstream airflow fluctuations.

Referring to FIGS. 1B, 3 and 5, the inlet manifold 30 defines four aerodynamic zones 41-44 per each pulse detonation tube inlet section 33. In a first aerodynamic zone 41, the air from the high-pressure compressor 16 flows into the inlet 36 provided in the first aerodynamic zone 41. In one embodiment, the inlet 36 is disposed and configured to function as a vaneless diffuser in the first aerodynamic zone 41 such that the air discharged from the compressor 16 can be collected and directed into a vaned diffuser composed of a plurality of guide vanes 40 disposed in the second aerodynamic zone 42. The air that exits the compressor stage with swirl is collected for a full circumference in zone 41 comprised of the inlet 36. The vaneless diffuser disposed in the first aerodynamic zone is configured to provide an aerodynamic buffer by isolating the compressor from any downstream pressure fluctuations. The zone 41 constitutes a vaneless diffuser section and the zone 42 comprises a vaned diffuser section, respectively.

The vaned diffuser composed of a plurality of guide vanes 40 is disposed in the second aerodynamic zone 42 located next to the first aerodynamic zone 41 composed of the inlet 36. The guide vanes 40 are configured to slow the air from the compressor 16 and maximize a static pressure of the air going into the pulse detonation tube valve 52. The guide vanes 40 are fixed and deswirl the air that exits from the vaneless diffuser section of the first aerodynamic zone 41. In one exemplary embodiment, the vaned diffuser comprises twenty-four guide vanes 40 and replicates the conventional twenty-four diffuser pipes. It will be appreciated that the number of the guide vanes 40 is not limited to a particular number and is variable depending on the engine design.

The third aerodynamic zone 43 is located between the second aerodynamic zone 42 and an individual detonation tube inlet section 33. The aerodynamic zone 43 is open for the full circumference. The air that exits from the guide vanes 40 is directed into individual chamber or pulse detonation tube that is coupled to the pulse detonation engine tube valve 52. There are two conditions: (1) when an air value (not shown) for the pulse detonation tube is open, the air flows into the chamber, and (2) when the air valve is closed, the air can bypass the chamber and flow into the next chamber. A circumferential plenum (not shown) is provided in the third aerodynamic zone 43 and this plenum or scroll area is sized to provide a location where the air can continue to flow into a next manifold when the air valve for the pulse detonation tube closes in a preceding manifold. By providing the circumferential plenum in the third aerodynamic zone 43, the airflow of an individual path can continue circulating when the pulse detonation tube air valve closes and momentarily stagnates the air in the detonation tube manifold.

The fourth zone 44 is disposed next to the third aerodynamic zone 43. In one embodiment, a splitter (not shown) is provided in the fourth zone 44 to split the air from the compressor into the airflow required by each pulse detonation tube for detonation. The air includes a combustion air and a bypass air. These features all serve to reduce or eliminate any impact of the transient flow resulting from the pulse detonation combustor on the upstream performance of the high-pressure centrifugal compressor rotor. Each aerodynamic zone is configured to individually feed a single pulse detonation tube, and this isolates the flow and minimizes the back pressure pulse coming from the opening of the valves in the detonation tubes.

Another function of the inlet manifold 30 is to provide an airflow required for the turbine cooling. According to one exemplary embodiment, one bleed port 34 per each pulse detonation tube inlet section 33 is provided downstream of the guide vanes 40, in some embodiments in the fourth aerodynamic zone 44 at the point of the separation to the detonation tube inlet 32. These bleed ports 34 smoothly extract high pressure airflow which will be conditioned to provide cooling air for the high pressure turbine. In addition, these bleed ports 34 can be used with existing interstage bleed and handling bleed to maintain and augment compressor stability during sudden power demand changes or when the core flow is reduced due to a 25-percent power requirement.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An inlet manifold for a multi-tube pulse detonation engine, comprising:
    a vaneless diffuser disposed in a first aerodynamic zone, said vaneless diffuser configured to collect air discharged from a compressor and direct it into a second aerodynamic zone;
    a vaned diffuser including a plurality of guide vanes disposed in the second aerodynamic zone, said vaned diffuser configured to slow air from the vaneless diffuser;
    a structure defining a plenum disposed in a third aerodynamic zone, said plenum sized to provide a location where the air can continue to flow into a next manifold when an air valve for the pulse detonation tube closes in a preceding manifold;
    a plurality of pulse detonation tube inlets disposed in a fourth aerodynamic zone, said plurality of pulse detonation tube inlets configured to split the air from the compressor into an airflow required by each pulse detonation tube for detonation, wherein said air includes a combustion air and a bypass air; and
    a plurality of bleed ports disposed between the plurality of guide vanes and the plurality of pulse detonation tube inlets, the number of bleed ports in the plurality of bleed ports equaling the number of pulse detonation tube inlets in the plurality of pulse detonation tube inlets.

2. The inlet manifold of claim 1, wherein the inlet manifold is a single integrated part with said first through fourth aerodynamic zones.

3. The inlet manifold of claim 1, wherein said vaned diffuser is configured to maximize a static pressure of the air going into pulse detonation tubes.

4. The inlet manifold of claim 1, wherein the vaned diffuser disposed in the second aerodynamic zone includes twenty-four guide vanes.

5. The inlet manifold of claim 1, wherein at least six bleed ports are provided in the inlet manifold.

6. The inlet manifold of claim 1, wherein said bleed ports are configured to provide an airflow required for cooling a high pressure turbine.

7. The inlet manifold of claim 1, wherein said bleed ports are configured to maintain compressor stability during sudden power demand changes.

8. The inlet manifold of claim 1, wherein the vaneless diffuser disposed in the first aerodynamic zone is configured to provide an aerodynamic buffer by isolating the compressor from any downstream pressure fluctuations.

9. The inlet manifold of claim 1, wherein the plenum disposed in the third aerodynamic zone is configured to provide an aerodynamic buffer by isolating the compressor from any downstream pressure fluctuations.

10. An inlet manifold for a multi-tube pulse detonation engine, comprising:
    a vaneless diffuser disposed in a first aerodynamic zone, said vaneless diffuser configured to collect an air discharged from a compressor and direct it into a second aerodynamic zone;
    a vaned diffuser including a plurality of guide vanes disposed in the second aerodynamic zone, said vaned diffuser configured to slow air from the vaneless diffuser;
    a structure defining a plenum disposed in a third aerodynamic zone, said plenum sized to provide a location where the air can continue to flow into a next manifold when an air valve for the pulse detonation tube closes in a preceding manifold;
    a plurality of pulse detonation tube inlets disposed in a fourth aerodynamic zone, said plurality of pulse detonation tube inlets configured to split the air from the compressor into an airflow required by each pulse detonation tube for detonation, wherein the inlet manifold is a single part with said first through fourth aerodynamic zones; and
    a plurality of bleed ports disposed between the plurality of guide vanes and the plurality of pulse detonation tube inlets, the number of bleed ports in the plurality of bleed ports equaling the number of pulse detonation tube inlets in the plurality of pulse detonation tube inlets.

11. The inlet manifold of claim 10, wherein the vaned diffuser disposed in the second aerodynamic zone includes twenty-four guide vanes.

12. The inlet manifold of claim 10, wherein at least six bleed ports are provided in the inlet manifold.

13. The inlet manifold of claim 10, wherein said bleed ports are configured to provide an airflow required for cooling a high pressure turbine.

14. The inlet manifold of claim 10, wherein said bleed ports are configured to maintain compressor stability during sudden power demand changes.

15. An inlet manifold for a multi-tube pulse detonation engine, comprising:
    a vaneless diffuser disposed in a first aerodynamic zone, said vaneless diffuser configured to collect an air discharged from a compressor and direct it into a second aerodynamic zone;
    a vaned diffuser including a plurality of guide vanes disposed in the second aerodynamic zone, said vaned diffuser configured to slow air from the vaneless diffuser;
    a structure defining a plenum disposed in a third aerodynamic zone, said plenum sized to provide a location where the air can continue to flow into a next manifold when an air valve for the pulse detonation tube closes in a preceding manifold; and
    a plurality of pulse detonation tube inlets disposed in a fourth aerodynamic zone, said plurality of pulse detonation tube inlets configured to split the air from the compressor into an airflow required by each pulse detonation tube for detonation, wherein the inlet manifold is a single part with said first through fourth aerodynamic zones; and a plurality of bleed ports disposed between the plurality of guide vanes and the plurality of pulse detonation tube inlets, the number of bleed ports in the plurality of bleed ports equaling the number of pulse detonation tube inlets in the plurality of pulse detonation tube inlets, the plurality of bleed ports configured to provide an air for cooling turbines.

16. The inlet manifold of claim 15, wherein the vaned diffuser disposed in the second aerodynamic zone includes at least twenty-four guide vanes.

17. The inlet manifold of claim 15, wherein at least six bleed ports are provided in the inlet manifold.

18. The inlet manifold of claim 15, wherein said bleed ports are configured to provide an airflow required for cooling a high pressure turbine.

* * * * *